Oct. 22, 1968   H. J. BLASKOWSKI   3,406,664
WASTE HEAT BOILER
Filed Dec. 29, 1966

INVENTOR
HENRY J. BLASKOWSKI

By E L Kochey

AGENT

United States Patent Office 3,406,664
Patented Oct. 22, 1968

3,406,664
WASTE HEAT BOILER
Henry J. Blaskowski, Simsbury, Conn., assignor to Combustion Engineering, Inc., Windsor, Conn., a corporation of Delaware
Filed Dec. 29, 1966, Ser. No. 605,884
5 Claims. (Cl. 122—7)

ABSTRACT OF THE DISCLOSURE

A waste heat boiler for pyrite roaster gas having a horizontally elongated open passageway for radiation cooling of gases passing therethrough and a hopper in the bottom for the collection of solids. A gas inlet at one end of the radiation chamber and a baffle wall of horizontal tubes at the outlet end. Vertical pendant tubular convection heating surface beyond the baffle wall. The walls of the passageway are formed of a plurality of tubes formed into individual panels serially connected with external downcomers. A steam drum and a circulating pump recirculating water to the steam drum through the panels, horizontal baffle tubes and pendants in parallel. A modular construction of the walls and pendants.

Background of the invention

A flash smelting operation has been developed to obtain iron ore and sulfur from pyrites. The key point in this process is the flash-smelting operation. Here the pyrites decompose into iron sulfide and sulfur in a specially designed furnace having burners for the combustion of fuel oil with combustion supporting air only slightly above the stoichiometric amount. The reaction temperature is about 327° F. so that the iron sulfide is liquified while the sulfur and impurities present in the ore are volatized. A portion of the iron sulfide is removed in the flash-smelting furnace. Gases at 220° F. are then conveyed to a waste heat boiler, which is the subject of this invention. The general plant process is described in the Feb. 14, 1966, issue of Chemical Engineering, pages 122–124.

Since the gas passing to the waste heat boiler still contains particles of iron sulfide, the gas is passed through a radiation chamber at low velocity so that the particles may separate by gravity and then through a convection chamber for more efficient heat transfer. The horizontal flow of gases through this waste heat boiler is required for satisfactory separation of the iron sulfide particles. This produces a low head waste heat boiler which, in turn, presents complications in arranging the unit for adequate circulation through the steam generating tubes.

Summary of the invention

In my invention a forced circulation boiler is used for waste heat recovery. The walls of a horizontally elongated radiation chamber are cooled by individual panels of tubes with flow passing only upwardly through the tubes. These panels may be of identical modules or of varying width to effect desired mass flow rates. A tubular horizontal baffle wall behind the radiation chamber forces the gas flow over the convection surface, and has horizontal circuits with forced circulation therethrough. Convection surface is formed of a plurality of vertical pendants each formed of a plurality of adjacent return elements of identical construction. A plurality of the pendants are in series with mixing between each pendant pass.

Figure 1:
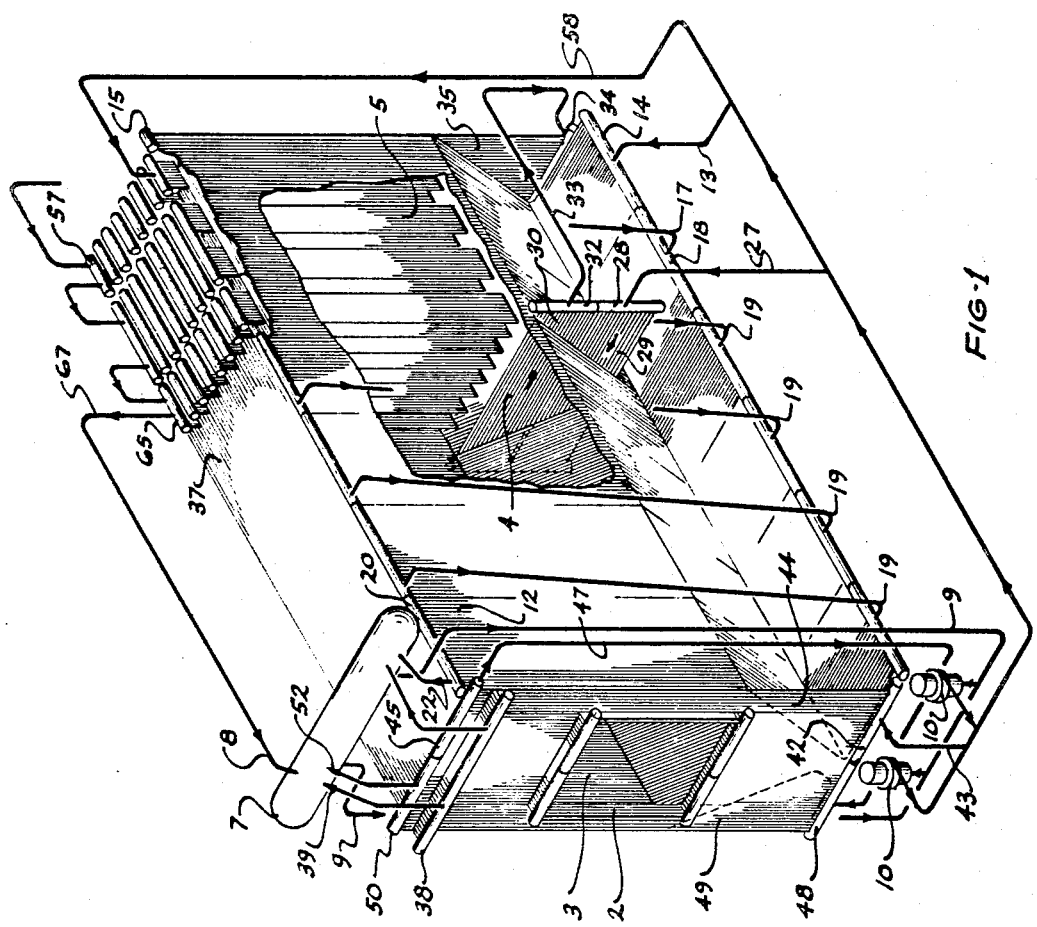
Figure 2:
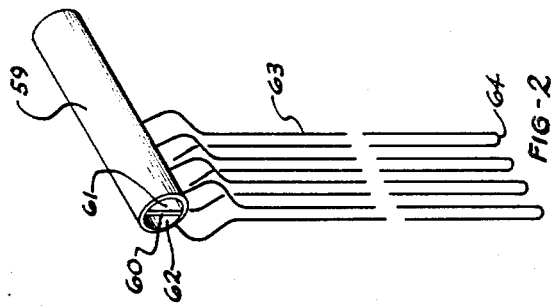

FIGURE 1 is an isometric view of the entire waste heat boiler; and
FIGURE 2 is a detail of the pendant arrangement.

Gas flowing from the flash-smelting furnace passes through the inlet opening 2 into the radiation chamber 3. The gas flows horizontally through this radiation chamber at relatively low velocity with the iron sulfide particles dropping into the lower hopper. At the far end of the radiation chamber is the horizontal baffle wall 4 which baffles the gas flow upwardly thereover so that it passes over convection surface formed of the pendant sections 5. The gas then passes outwardly through an opening at the rear of the convection chamber which is similar to the inlet opening.

Steam drum 7 is supplied with feedwater, and a water level is maintained therein. While any steam generated is conveyed to a point of use through steam outlet 8, saturated water along with the incoming feedwater is conveyed downwardly through downcomers 9 to the circulating pumps 10. The water from the circulating pump is passed through a number of different type circuits for heat absorption. Each of these contains heating surface of a different characteristic, and the supply lines to each section may be orificed as desired to obtain a proper distribution of flow between the various types of heating surface.

The side walls of the unit are covered by vertical steam generating tubes formed in a plurality of individual panels 12. The supply to these panels passes from the recirculating pump 10 through the panel supply line 13 to a panel inlet header 14. The water flows upwardly through the tubes along the hopper slope and then vertically up the wall to the first panel outlet header 15. Downcomer 17 is located outside of the heating zone and conveys the steam-water mixture from the first outlet header downwardly to the second panel inlet header 18. This flow then passes in series throughout the remainder of the waterwall panels on this wall of the unit, each time returning downwardly through external downcomers 19. From the final pass outlet header 20 the steam-water mixture pases through relief tube 22 to the steam drum 7 where the steam and water are separated, with the steam passing outwardly through steam line 8 and the water being again recirculated.

Stable flow may be maintained in these panel circuits since all of the heated circuits contain only upflow, and overheating of any particular tube tends to increase the flow in the tube needing the heat. Flow distribution problems are avoided by using external unheated downcomers for all downward flow. Each of these panels are identical modules simplifying the fabrication work involved in building the unit. Panels of different widths may be used to effect variation of the mass flow rate in the various panels.

A second circuit includes a portion cooling the horizontal baffle wall 4. Water supply for this circuit passes from the circulating pump 10 through the baffle supply line 27 to the baffle inlet header 28. The flow then passes horizontally through horizontal tubes 29 in the lower half of the baffle wall to an outlet header on the far side of the unit. A similar circuit on the far side of the unit supplies water to an inlet header for the horizontal tubes 30 of the upper half of the baffle wall with water passing through the tubes to the baffle wall outlet header 32. Line 33 conveys this fluid to the rear wall inlet header 34 with a similar line located on the far side of the unit. This flow is then passed upwardly through tubes 35 forming the rear wall of the unit and then through the roof tubes 37 to the roof outlet header 38. The steam-water mixture from this header is then passed upwardly through relief tubes 39 to the steam drum 7.

A third independent circuit cools the front wall of the unit. Water is supplied to the front wall inlet header 42 through supply line 43, with the water passing upwardly through tubes 44 covering the near half of the front wall.

This flow exits to the upper header 45 and is conveyed downwardly through external downcomer 47 to the lower front wall header 48 on the far side of the front wall. From this header the flow passes upwardly through the tubes 49 covering the far side of the front wall to the front wall outlet header 50 and from there it passes to steam drum 7 through relief tube 52.

A fourth independent circuit passes water through the convection pendant sections 5. Water is supplied to each of the initial pendant inlet headers 57 through supply line 58. The header contains a vertical baffle 60 separating the header into an inlet portion 61 and an outlet portion 62. At the inlet the water is baffled so that it passes only into the inlet header inlet portion 61. The pendant 5 is formed of a plurality of adjacent return elements 63. These elements each have a close return bend 64 at the bottom so that the 2 inch diameter tubes are on approximately 4½ inch spacings. Since the panel is formed of a plurality of these identical elements, detailing and fabricating of the panel is simplified and inventory requirements for replacement elements are minimized since they are all identical. While a divided header is illustrated, two headers could, of course, be used, one being an inlet with the other being an outlet.

After passing through the first pendant section, the flow is conveyed horizontally through the outlet header with this portion of the header then forming the inlet portion for the second pendant assembly. In a similar manner the fluid is conveyed serially through the four pendant assemblies with the steam-water mixture being collected in the convection outlet headers 65 and conveyed to the steam drum 7 through relief tube 67.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A forced recirculation waste heat steam generating unit for particle laden hot gas, comprising: a radiation chamber having a hot gas inlet and a hopper in the bottom thereof; a convection chamber downstream of said radiation chamber with respect to gas flow; a steam drum; tubes lining the walls of the unit so as to absorb heat from the hot gases passing through the unit; means for conveying water from said steam drum to said tubes; means for conveying steam and water from said tubes to said drum; characterized by: a circulating pump in said means for conveying water from said steam drum to said tubes; the tubes lining the walls formed into a plurality of panels; means for conveying water and steam downwardly from the outlet of one panel to the inlet of the succeeding panel; convection steam generating surface comprising a plurality of pendant assemblies in series flow relation with respect to water flow, each pendant comprised of a plurality of tubes, each having an identical radius close return bend at the lower end, so that riser tubes within each pendant are intermediate the downcomer tubes; and means for conveying water from said circulating pump through said convection surface, and then to said steam drum in parallel flow relation with said tubes lining the walls of the unit.

2. An apparatus as in claim 1 having also: horizontal tubes forming a baffle wall at the gas outlet end of said radiation chamber; means for conveying water from said circulating pump through said horizontal tubes, and then to said steam drum in parallel flow relation with said tubes lining the walls of the unit.

3. An apparatus as in claim 2 having also: roof tubes covering the roof of the chambers of the unit; means for conveying water from said horizontal tubes to the roof tubes, and then to said steam drum.

4. An apparatus as in claim 3 having also: vertical tubes covering a wall in the convection chamber through which the gases exit; means for conveying water from said horizontal tubes to the vertical tubes and then to said roof tubes.

5. A forced recirculation waste heat steam generating unit for particle laden hot gas, comprising: a radiation chamber having a hot gas inlet and a hopper in the bottom thereof; a convection chamber downstream of said radiation chamber with respect to gas flow; a steam drum; tubes lining the walls of the unit so as to absorb heat from the hot gases passing through the unit; means for conveying water from said steam drum to said tubes; means for conveying steam and water from said tubes to said drum; characterized by: a circulating pump in said means for conveying water from said steam drum to said tubes; the tubes lining the walls formed into a plurality of panels; means for conveying water and steam downwardly from the outlet of one panel to the inlet of the succeeding panel; horizontal tubes forming a baffle wall at the gas outlet end of said radiation chamber; and means for conveying water from said circulating pump through said horizontal tubes, and then to said steam drum in parallel flow relation with said tubes lining the walls of the unit.

References Cited

UNITED STATES PATENTS

| 2,840,054 | 6/1958 | Rowand. | |
| 3,159,146 | 12/1964 | Rudolph | 122—6 X |
| 3,343,523 | 9/1967 | Gorzegno et al. | 122—406 |

FOREIGN PATENTS

| 492,121 | 9/1938 | Great Britain. |
| 643,840 | 9/1950 | Great Britain. |

CHARLES J. MYHRE, *Primary Examiner.*

PO-1050
(5/69)

UNITED STATES PATENT OFFICE
CERTIFICATE OF CORRECTION

Patent No. 3,406,664            Dated October 22, 1968

Inventor(s) Henry J. Blaskowski

It is certified that error appears in the above-identified patent and that said Letters Patent are hereby corrected as shown below:

Column 1, line 35, change "327°F" to --3270°F--.
Column 1, line 38, change "220°F" to --2200°F--.

SIGNED AND
SEALED

NOV 18 1969

(SEAL)
Attest:

Edward M. Fletcher, Jr.            WILLIAM E. SCHUYLER, JR.
Attesting Officer            Commissioner of Patents